(12) United States Patent
Tsao et al.

(10) Patent No.: US 7,151,931 B2
(45) Date of Patent: Dec. 19, 2006

(54) METHOD AND SYSTEM ENABLING ROAMING BETWEEN DIFFERENT WIRELESS NETWORKS

(75) Inventors: Shiao-Li Tsao, Taipei (TW); Chia-Ching Lin, Pingtung (TW)

(73) Assignee: Industrial Technology Research Institute, Hsinchu (TW)

( * ) Notice: Subject to any disclaimer, the term of this patent is extended or adjusted under 35 U.S.C. 154(b) by 270 days.

(21) Appl. No.: 10/374,111

(22) Filed: Feb. 27, 2003

(65) Prior Publication Data
US 2004/0192295 A1 Sep. 30, 2004

(30) Foreign Application Priority Data
Jun. 19, 2002 (TW) ............................ 91113346 A

(51) Int. Cl.
H04Q 7/20 (2006.01)
(52) U.S. Cl. .................. 455/435.2; 455/435.1; 455/435.3; 455/436; 455/438; 455/439; 455/442; 370/216; 370/238; 370/351
(58) Field of Classification Search ............ 455/432.1, 455/422.1, 435.1, 403, 455, 435.2, 435.3, 455/436, 438, 439, 445, 452.2, 442; 370/328–338, 370/216, 238, 351
See application file for complete search history.

(56) References Cited

U.S. PATENT DOCUMENTS

| | | | | |
|---|---|---|---|---|
| 5,819,178 | A * | 10/1998 | Cropper | 455/433 |
| 6,564,060 | B1 * | 5/2003 | Hoagland | 455/450 |
| 6,771,609 | B1 * | 8/2004 | Gudat et al. | 370/254 |
| 6,873,844 | B1 * | 3/2005 | Ang et al. | 455/424 |
| 2001/0015977 | A1 * | 8/2001 | Johansson | 370/392 |
| 2002/0068565 | A1 * | 6/2002 | Purnadi et al. | 455/436 |
| 2002/0085516 | A1 * | 7/2002 | Bridgelall | 370/329 |
| 2002/0087674 | A1 * | 7/2002 | Guilford et al. | 709/223 |
| 2002/0089968 | A1 * | 7/2002 | Johansson et al. | 370/349 |
| 2002/0147008 | A1 * | 10/2002 | Kallio | 455/426 |
| 2004/0100923 | A1 * | 5/2004 | Yam | 370/328 |
| 2004/0180664 | A1 * | 9/2004 | Numminen et al. | 455/445 |
| 2005/0003805 | A1 * | 1/2005 | Zaffino | 455/414.1 |

OTHER PUBLICATIONS

"Handoff in Hybrid Mobil Data Networks", K. Pahlavan et al., IEEE Personal Communications, Apr. 2000, pp. 34-47.

"Wireless LAN Access Network Architecture for Mobile Operators", J. Ala-Laurila et al., IEEE Communications Magazine, Nov. 2001, pp. 82-89.

"Optimization Scheme for Mobile Users Performing Vertical Handoffs Between IEEE 802.1 and GPRS/EDGE Networks". M. Ylianttila et al., IEEE, 2001, pp. 3439-3443.

"Design Issues of Mobile IP Handoffs between General Packet Radio Service (GPRS) Networks and Wireless LAN (WLAN) Systems", S. Aust et al., IEEE, 2002, pp. 868-872.

"Mobile Network Evolution: A Revolution on the Move", J. De Vriendt et al., IEEE Communications Magazine, Apr. 2002, pp. 104-111.

(Continued)

*Primary Examiner*—George Eng
*Assistant Examiner*—Khai Nguyen
(74) *Attorney, Agent, or Firm*—Birch, Stewart, Kolasch & Birch, LLP

(57) ABSTRACT

A method and system enabling roaming between different wireless networks. A mobile device supporting low and high-tier wireless network standards is adapted to roam between a low-tier wireless network and a high-tier wireless network with lower bandwidth but more mobility than the low-tier wireless network. Via a virtual GPRS support node, a plurality of data packets and control signals are delivered between low and high-tier wireless networks.

15 Claims, 14 Drawing Sheets

OTHER PUBLICATIONS

"WLAN-GPRS Integration for Next-Generation Mobile Data Networks", A. Salkintzis et al., IEEE Wireless Communications, Oct. 2002, pp. 112-124.

"UMTS-WLAN Interworking: A Gateway Approach", Shiao-Li Tsao et al., Industrial Technology Research Institute, 2002, pp. 104-111.

* cited by examiner

METHOD AND SYSTEM ENABLING ROAMING BETWEEN DIFFERENT WIRELESS NETWORKS

This nonprovisional application claims priority under 35 U.S.C. § 119 (a) on Patent Application No. 091113346 filed in TAIWAN on Jun. 19, 2002, which is herein incorporated by reference.

BACKGROUND OF THE INVENTION

1. Field of the Invention

The invention relates to wireless communication, and more particularly to a method and a system enabling roaming between different wireless networks in which, via a virtual GPRS support node, a plurality of data packets and control signals are delivered between low and high-tier wireless networks.

2. Description of the Related Art

A number of wireless network technologies have been proposed during the past few years. New radio access technologies and wireless network standards are also being developing. It is believed that multiple standards will coexist in the same environment for future wireless communication systems. Enabling seamless roaming between different networks is becoming more and more important in multiple standard environments. Different radio access networks have their own properties. High-tier systems such as General Packet Radio Service (GPRS) and Universal Mobile Telecommunication System (UMTS) provide high mobility with lower data transmission bandwidth. On the other hand, low-tier systems such as wireless local area network (Wireless LAN, WLAN) provides high data bandwidth but with less mobility.

FIG. 1 shows two different wireless networks 100 and 200 conventionally connected. Here, the wireless network 100 is a GPRS network used as an example of a high tier system. The wireless network 200 is a WLAN used as an example of a low tier system. As shown in FIG. 1, the GPRS network 100 comprises three base station systems (BSSs) 104a~104c, three Serving GPRS Support Nodes (SGSNs) 106a~106c, a Gateway GPRS Support Node (GGSN) 108a, a domain name server (DNS) 110 and a dynamic host configuration protocol (DHCP) Server 112. BSSs 104a~104c can convert wireless signals to data. Cells of BSSs 104a~104c are 102a~102c. The cells 102a~102c normally cover 500 meters to 30 km. SGSNs 106a~106c relay data packets and regulate mobility management (GMM) and session management (SM) such as managing different routing areas (RAs) and mobile stations (MSs). GGSN 108a is an interface between the GPRS network 100 and an external network such as the Internet 300.

For embodied explanation of the WLAN, an example is given in the following. As shown in FIG. 1, the WLAN 200 comprises access points whose cells are 202a~202i, two routers 206a and 206b, a gateway 208, a DNS 210 and a DHCP Server 212. The cells 202a~202i normally cover 100 meters to 300 meters. Because the coverage of the cells in the WLAN is much lower than the cells in the GPRS network, the WLAN is normally installed in a "hot spot" area such as a building, station or airport. As well, one "hot spot" area installed the WLAN often comprises several access points.

For dual mode devices, there are several approaches to enable data communication in multiple networks. In the simplest approach, the two networks are used independently. FIG. 2 shows this example. The topology of the network in FIG. 2 is the same as in FIG. 1. Dotted line A in FIG. 2 shows the roaming route of the mobile device 40 supporting the GPRS standard and WLAN standard. The mobile device 40 attaches to the GPRS network 100 at point A1 and starts to access a remote host 42 through the Internet 300. Then, packets can be delivered between the mobile device 40 and the remote host 42. While the mobile device 40 detects the signal from the WLAN 200 becoming stronger than the previous one (GPRS network 100) such as at point A2, it stops the service from the GPRS network 100 and attaches to the new network (WLAN 200). In this approach, all of the current links and service will break since each network has its own network planning, routing, IP address and configurations.

In order to support unbreakable IP service during roaming, FIG. 3 shows another approach that introduces Mobile IP. The topology of the network in FIG. 3 is almost the same as in FIG. 2. The difference is that mobile IP devices 46a and 46b are added in FIG. 3. This approach provides unbreakable IP service. However, this approach requires installing mobile IP devices such as home agents and foreign agents 46a and 46b in both networks. Since the mobile device 40 requires return registration (to GPRS network 100), packet delay and loss will be also a problem during the period of handovers. Moreover, this approach suffers from triangle routing between the GPRS network 100 and the WLAN 200 if Mobile IP devices do not support route optimization (referring to dotted line C in FIG. 3).

Another approach is to let low tier system serve as a local radio access network under a high tier system. To connect a low tier base station to a high tier core network, an emulator is necessary. FIG. 4 shows connection of a WLAN base stations to a GPRS system. As shown in FIG. 4, the GPRS system comprises three base station systems (BSSs) 104a~104c, three Serving GPRS Support Nodes (SGSNs) 106a~105c, a Gateway GPRS Support Node (GGSN) 108a, a domain name server (DNS) 110, access points whose cells are 402a~402i, a BSS emulator 404 and a SGSN emulator 406. Every WLAN base station (access point) can be regarded as a GPRS base station through the BSS emulator 404 or a SGSN through the SGSN emulator 406. The benefit of this approach is that no mobile IP is required. All packet routing and forwarding are processed by GPRS core network. Packet loss and delay are greatly reduced. However, this approach lacks flexibly since the two networks are tightly coupled. The operators of the two networks must be the same in order to exchange large amounts of information. Another disadvantage of this approach is that GGSN will be the single point access to the Internet. Packets through two networks must follow GGSN first, creating a bottleneck.

SUMMARY OF THE INVENTION

An object of the present invention is to provide a method and a system enabling roaming between different wireless networks. Via a virtual GPRS support node, a plurality of data packets and control signals are delivered between low and high-tier wireless networks to provide seamless roaming between two different wireless networks for a mobile device, such that the two networks can be operated independently. As well, packets for roaming users traverse the node without processing by mobile IP through the Internet. The design reduces packet loss and delay.

Accordingly, the present invention provides a method enabling roaming between different wireless networks. The invention discloses a mobile device supporting low and high-tier wireless network standards adapted to roam between a low and high-tier wireless network with lower bandwidth but more mobility than the low-tier wireless network via virtual GPRS support node, a plurality of data packets and control signals are delivered between low and high-tier wireless networks.

Furthermore, the present invention also provides a system enabling roaming between different wireless networks. The system comprises low and high-tier wireless networks, a mobile device, and a virtual GPRS support node. The high-tier wireless network has lower bandwidth but more mobility than the low-tier wireless network. The mobile device supports low and high-tier wireless network standards. At the virtual GPRS support node, a plurality of data packets and control signals are delivered between low and high-tier wireless networks when the mobile device roams between the low and high-tier wireless networks.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE DRAWINGS

The present invention will become more fully understood from the detailed description given hereinbelow and the accompanying drawings, which are given by way of illustration only, and thus are not limitative of the present invention, and in which:

FIG. 11 shows procedures in which the mobile device moving from one RA to another RA after the procedures in FIG. 10a; and FIG. 12 shows procedures for a new host initializing connection with the mobile device after the procedures in FIG. 10a.

DETAILED DESCRIPTION OF THE INVENTION

Figure 1:
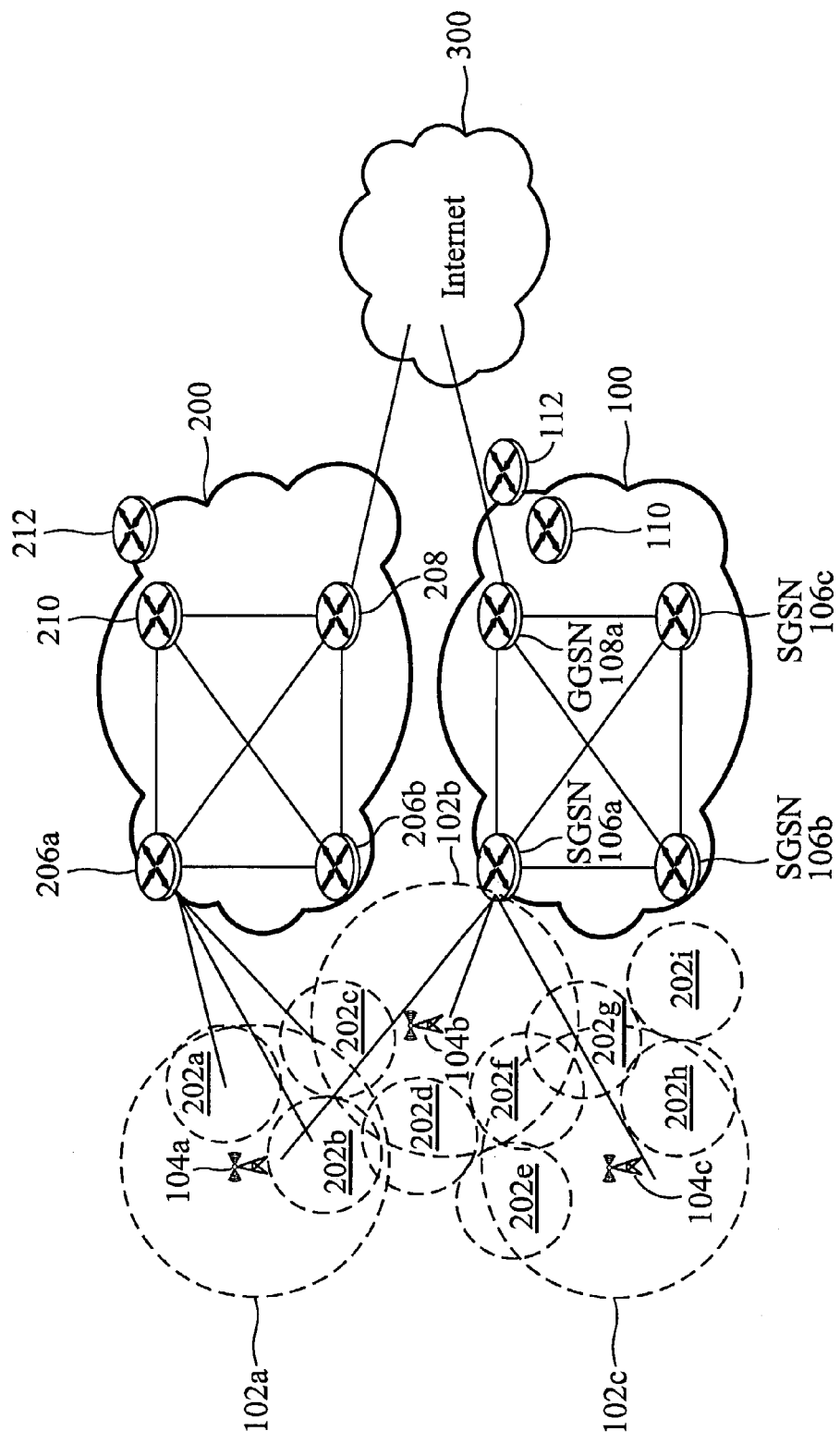
FIG. 1 shows two different wireless networks connected in the prior art.
Figure 2:
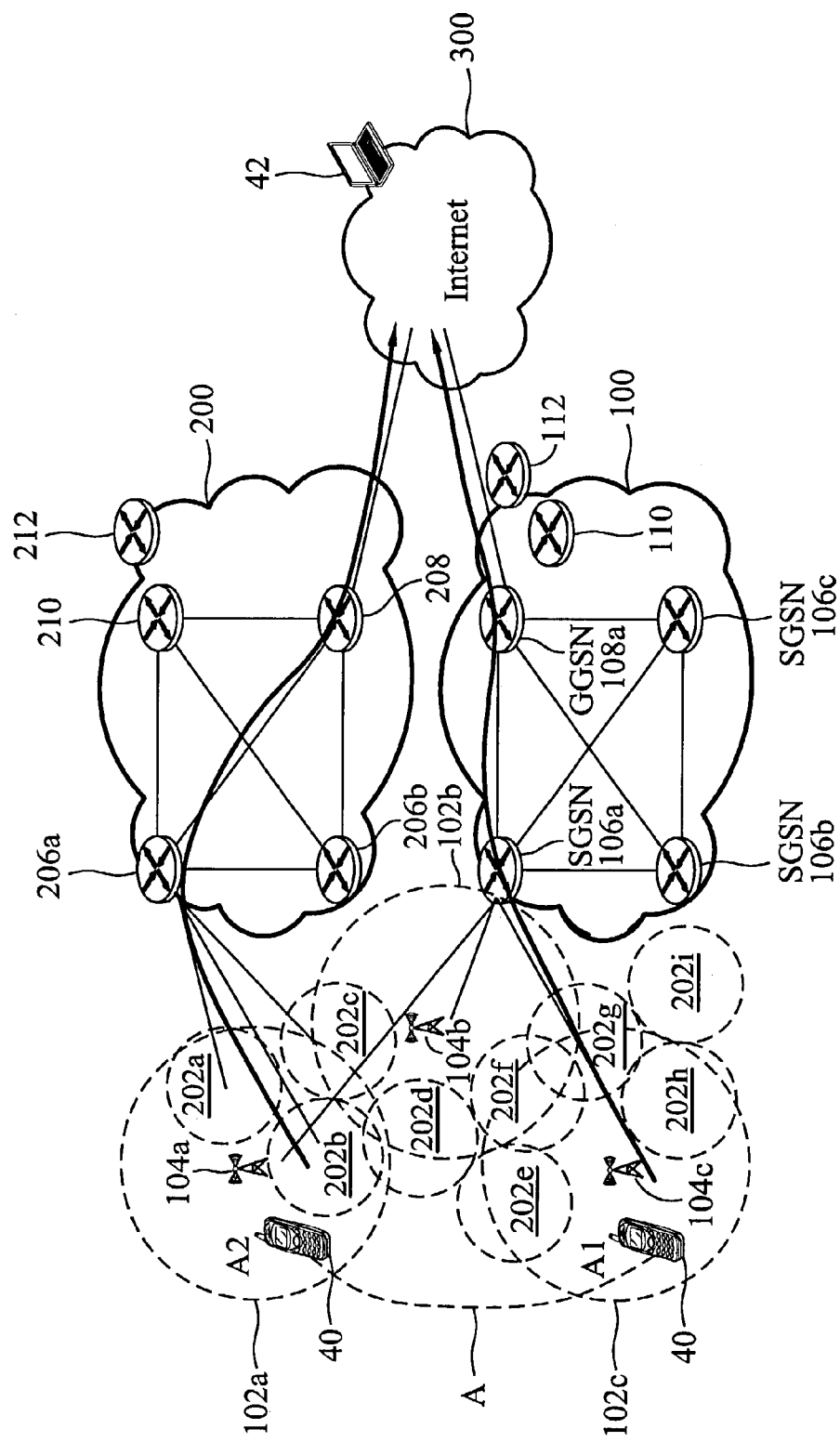
FIG. 2 shows an example of the simplest approach enabling roaming between the networks shown in FIG. 1.
Figure 3:
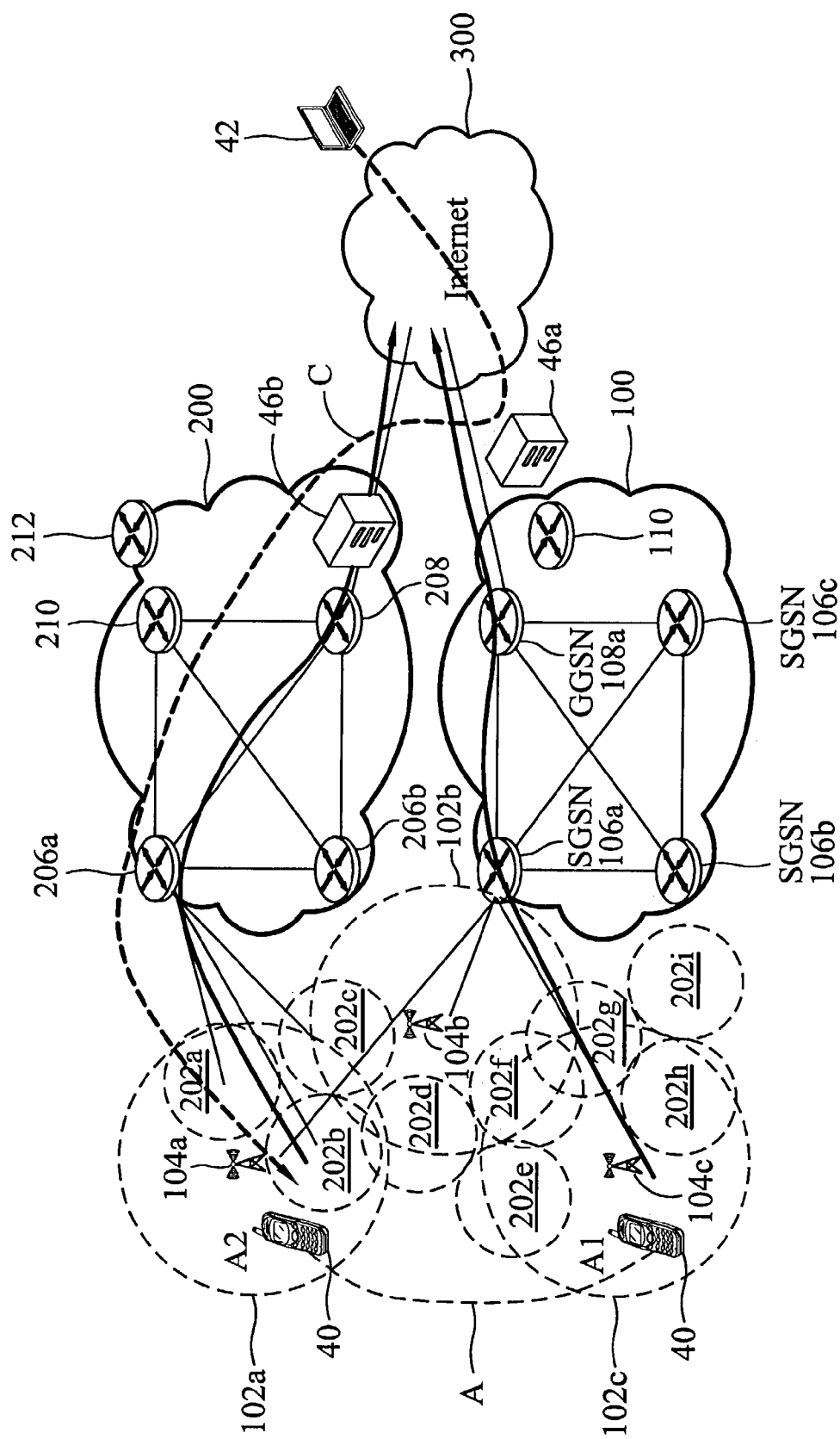
FIG. 3 shows another approach that introduces Mobile IP in the networks shown in FIG. 1.
Figure 4:
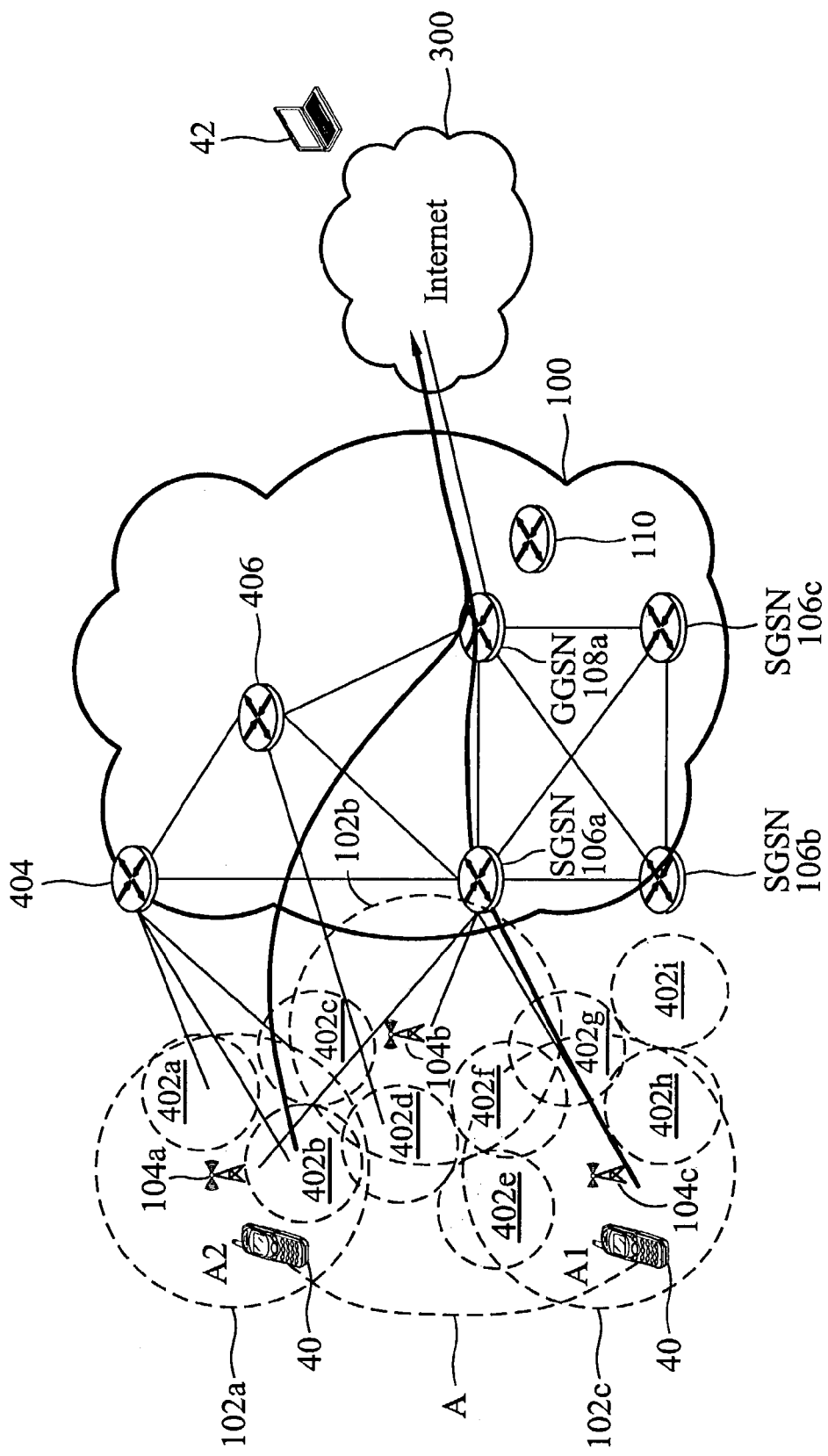
FIG. 4 shows another approach that connects WLAN base stations to a GPRS system.
Figure 5:
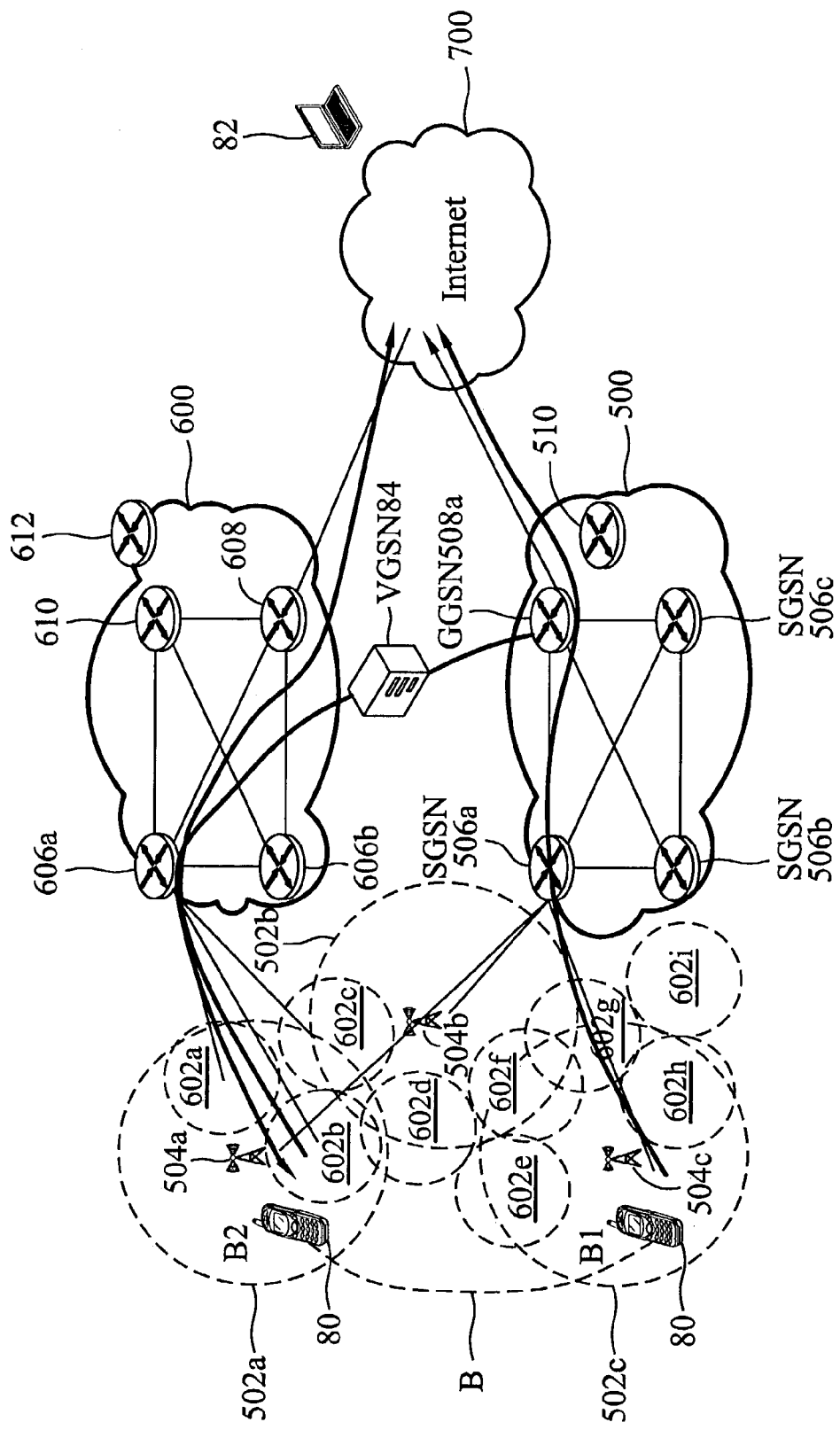
FIG. 5 shows an overall architecture in which two different wireless networks are connected to the Internet according to the first embodiment of the invention.

FIG. 5 shows an overall architecture in which two different wireless networks 500 and 600 are connected to the Internet 700 according to the first embodiment of the invention. Here, the wireless network 500 is a GPRS network used as an example of a high tier system. The wireless network 600 is a WLAN used as an example of a low tier system.

For embodied explanation of GPRS network, an example is given in the following. As shown in FIG. 5, the GPRS network 500 comprises three base station systems (BSSs) 504a~504c, three Serving GPRS Support Nodes (SGSNs) 506a~506c, a Gateway GPRS Support Node (GGSN) 508a and a domain name server (DNS) 510. BSSs 504a~504c can convert wireless signals to data. Cells of BSSs 504a~104c are 502a~502c. The cells 502a~502c normally cover 500 meters to 30 km. SGSNs 506a~506c relay data packets and regulate mobility management (GMM) and session management (SM) such as managing different routing areas (RAs) and mobile stations (MSs). GGSN 508a is an interface between the GPRS network 500 and an external network such as the Internet 700.

For embodied explanation of the WLAN, an example is given in the following. As shown in FIG. 5, the WLAN 600 comprises access points AP1~AP2 whose cells are 602a~602i respectively, two routers 606a and 606b, a gateway 608, a DNS 610 and a DHCP Server 612. The cells 602a~602i normally cover 100 meters to 300 meters.

A new logical node, called virtual GPRS support Node (VGSN) 84, is presented in FIG. 5. The logical entity can be either implemented as a separated node or integrated with Gateway in WLAN or SGSN or GGSN nodes. Two wireless networks are managed separately, i.e. the two networks can be operated by two different operators. Only one VGSN 84 is inserted between two systems if two networks are to provide seamless roaming service. The situation is quite normal for a "hot spot" area such as airports and stations.

The mobile device 80 can be a mobile phone or personal digital assistant. Dotted line B in FIG. 5 shows the roaming route of the mobile device 80 supporting the GPRS standard and WLAN standard. The mobile device 80 attaches to the GPRS network 500 at point B1 and starts to access a remote host 82 through the Internet 700. Then, packets can be delivered between the mobile device 80 and the remote host 82. While the mobile device 80 detects the signal from the WLAN 600 becoming stronger than the previous one (GPRS network 500) such as at point B2, it can hand over to the WLAN 600 to access higher speed if the two networks 500 and 600 have a roaming agreement. Assuming the IP address allocated to the mobile device 80 (or mobile station (MS)) does not change during the entire period of data service in the different networks, when the mobile device 80 moves to the WLAN 600, the incoming packets originally from the GPRS network 500 to the mobile device 80 are sent through VGSN 84 to the WLAN 600 and end at the mobile device 80. The outgoing packets of the mobile device 80 can follow WLAN 600 directly. The detailed procedures are described in conjunction with FIG. 6~FIG. 8.

Figure 6:
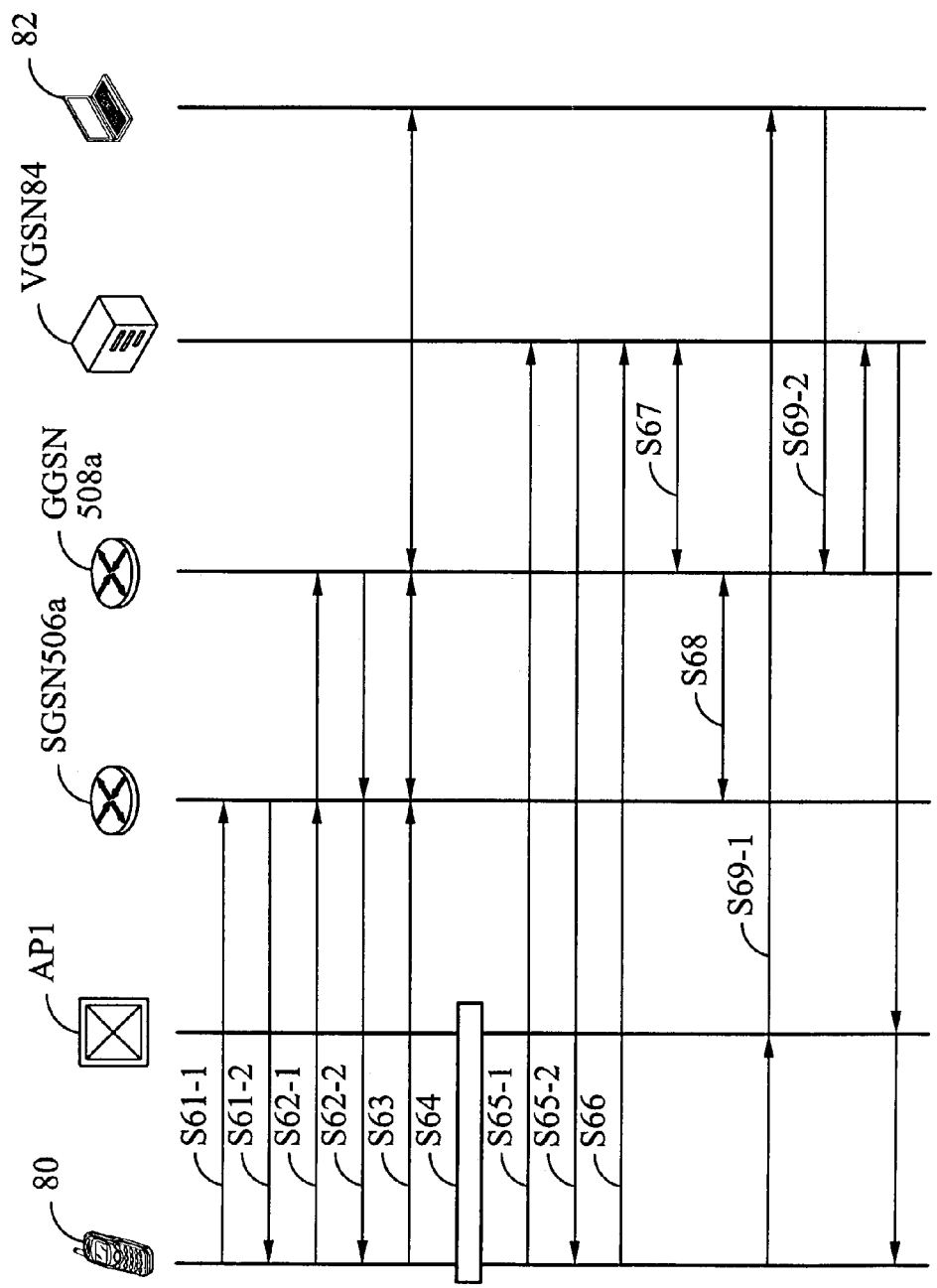
FIG. 6 shows the procedures of roaming from the GPRS network to the WLAN according to the first embodiment of the present invention.

FIG. 6 shows the procedures of roaming from the GPRS network to the WLAN according to the first embodiment of the present invention. From step S61 to S63, these are normal GPRS attach and packet data protocol (PDP) context activation procedures. According to GPRS specifications, the GPRS attach procedure establishes a mobility management context at the SGSN 506a to identify the location of the mobile device 80 (S61-1 and S61-2). When data packets are delivered between the mobile device 80 and the host 82, a PDP context is activated. The PDP context activation procedure establishes routing information in the SGSN 506a and the GGSN 508a to maintain a correct routing path between the mobile device 80 and the host 82 through the GPRS network 500. The PDP content comprises QoS profiles, access information and an IP address of the GGSN 508a. The PDP content is relieved when the mobile device 80 stop being served by the GPRS network 500. The choice procedure for GGSNs is achieved at the PDP context activation procedure. In other works, when the mobile device 80 receives the PDP context request, an operator of the GPRS system chooses one GGSN to mobile device 80 according to an access point name (APN) of the mobile device 80 or other selecting way. The serving relation between the chosen GGSN and the mobile device 80 exists until the PDP content is deactivated. After establishing the connection, data packets can be delivered between the mobile device 80 and the host 82 (S63).

At step S64, the mobile device 80 finds the WLAN 600 is available and initializes handover to an access point AP1 of the WLAN 600 to access higher speed. Step S64 performs handover procedures.

At step S65, the mobile device 80 requests VGSN address in order to perform following procedures. An example to resolve VGSN address in WLAN environment is using DHCP (dynamic host configuration protocol). At step S65-1, a signal is sent to ask VGSN 84 address in the WLAN 600. At step S65-2, VGSN 84 replies to the mobile device 80 with its IP address and the mobile device 80 receives it.

After the mobile device 80 obtains the IP address of VGSN 84, the mobile device 80 sends a routing area update (RA update) to VGSN 84 using the IP address originally used in the GPRS network 500 (S66).

At step S67, VGSN 84 sends a standard Update PDP contexts Request to GGSN 508a to request GGSN 508a to change its SGSN address-in-use. At this point, VGSN 84 simulates a SGSN in the GPRS network 500. Once GGSN 508a receives PDP context request from VGSN 84, it detects the mobile device 80 moving to the WLAN environment. VGSN 84 replaces the original SGSN 506a temporarily. Packets to the mobile device 80 route to VGSN 84 instead of the original SGSN 506a.

Since the mobile device 80 can move back to the GPRS network 500, data stored in the original SGSN 506a cannot be deleted even it moves to WLAN 600 temporarily. GGSN 508a sends a new packet data protocol/mobility management context standby command to the original SGSN 506a. The message requests the original SGSN 506a to hold PDP context until the mobile device 80 returns to the GPRS network or disconnects.

After the entire roaming procedure, the mobile device 80 sends packets out using the IP address originally used in the GPRS network 500. Packets from the mobile device 80 to the host 82 of the Internet 700 they can be sent through the access point AP1 of the WLAN 600 if the gateway 608 of the WLAN 600 does not ingress filter these GPRS IP address (S69-1). If the gateway 608 of the WLAN 600 applies ingress filtering on non-WLAN address, packets route to VGSN 84 to the Internet 700.

Packets from the host 82 to the mobile device 80 route to GGSN 508a of the GPRS network 500 based on IP routing. Then, GGSN 508a detects the mobile device 80 moving to the VGSN 84 and tunnels packets to VGSN 84. Finally, the packets are delivered from VSGN 84 to the access point AP1 (S69-2).

After a GPRS handover to WLAN environment, the device can move to another WLAN cell or return to GPRS network.

Figure 7:
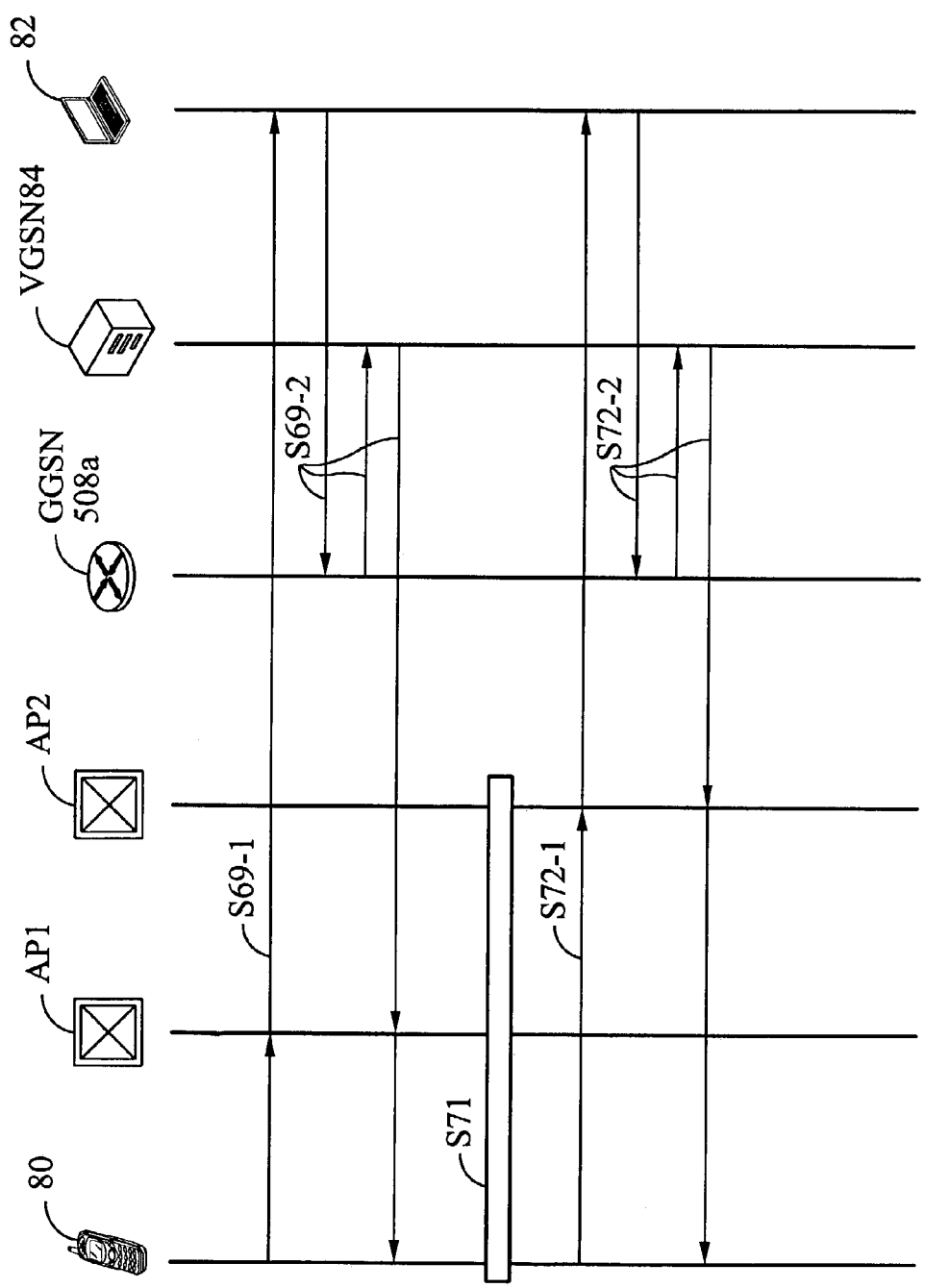
FIG. 7 shows procedures in which the mobile device moving from one WLAN base station to another after the procedures in FIG. 6.

FIG. 7 shows procedures in which the mobile device 80 moves from one WLAN base station to another. After step S69-2, the mobile device 80 moves from the cell 602a of the access point AP1 to the cell 602b of the access point AP2. Therefore, at step 71, handover procedure for the mobile device 80 from the access point AP1 to the access point AP2 takes place. The mobile device 80 sends the packet out using the IP address originally used in the GPRS network 500. Packets from the mobile device 80 to the host 82 of the Internet 700 can be sent through the access point AP2 of the WLAN 600 (S72-1). Packets from the host 82 to the mobile device 80 route to GGSN 508a of the GPRS network 500 based on IP routing. Then, GGSN 508a detects the mobile device 80 moving to the VGSN 84 and tunnels packets to VGSN 84. Finally, the packets are delivered from VSGN 84 to the access point AP2 (S72-2).

Figure 8A:
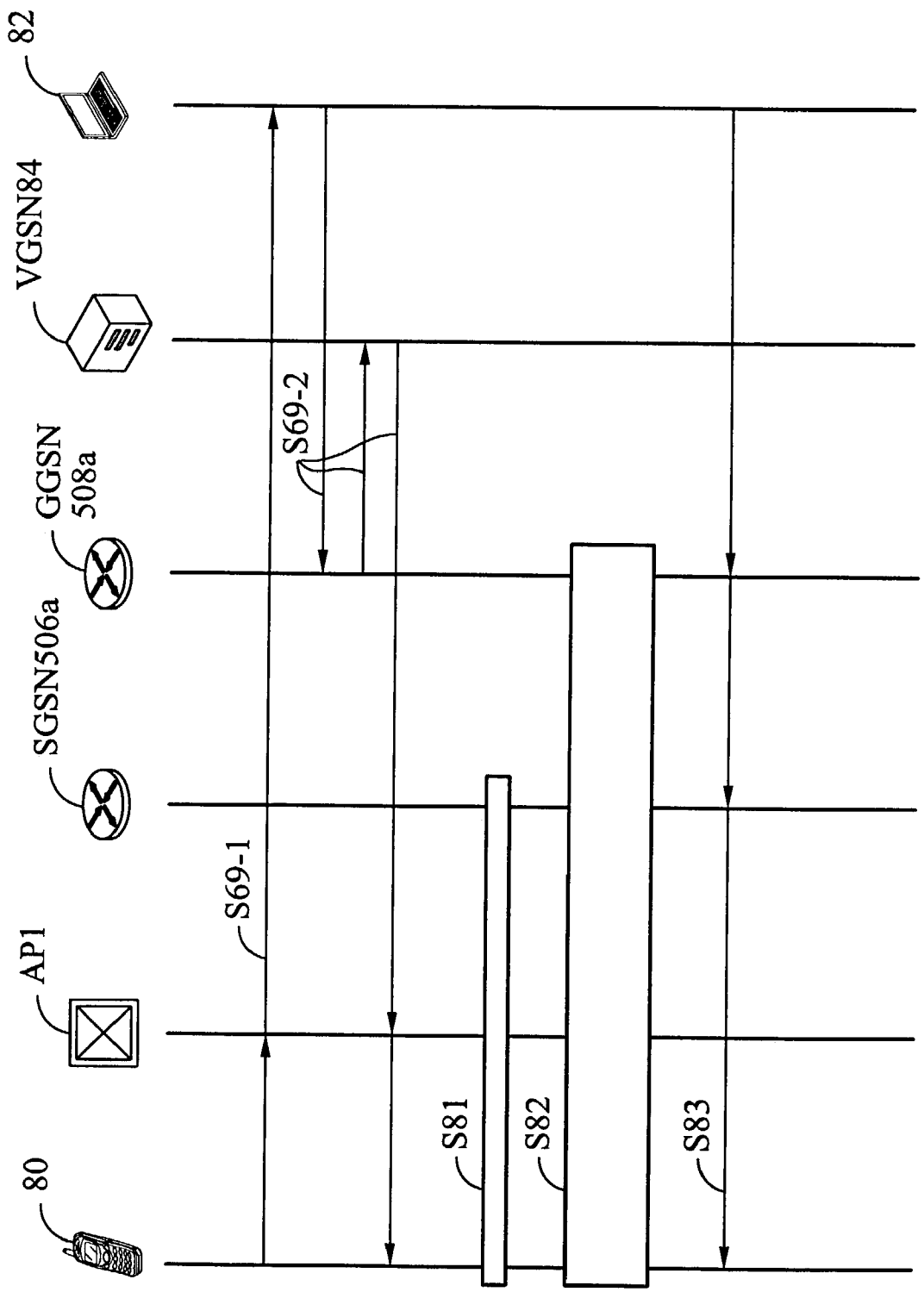
FIG. 8a shows procedures in which the mobile device moving from the WLAN to the GPRS network and returns to the original routing area (RA) after the procedures in FIG. 6.

FIG. 8a shows procedures in which the mobile device 80 moves from the WLAN network to the GPRS network and returns to the original routing area (RA). After step S69-2, the mobile device 80 moves from the cell 602a of the access point AP1 to the GPRS network 500 and returns to the original RA controlled by SGSN 506a.

Since PDP context is buffered in the SGSN 506a that the mobile device 80 first moves out to the WLAN 600, the handover procedures involve the old SGSN 506a. Therefore, at step 81, handover procedures for the mobile device 80 from the access point AP1 to SGSN 506a takes place.

Then, the mobile device 80 starts a normal RA update procedure (S82). It only updates SGSN-in-use in GGSN 508a. Packets going from the host 82 to the mobile device 80 are delivered to GGSN 508a first. The packets received by GGSN 508a route to the SGSN 506a instead of VGSN 84 (S83).

Figure 8B:
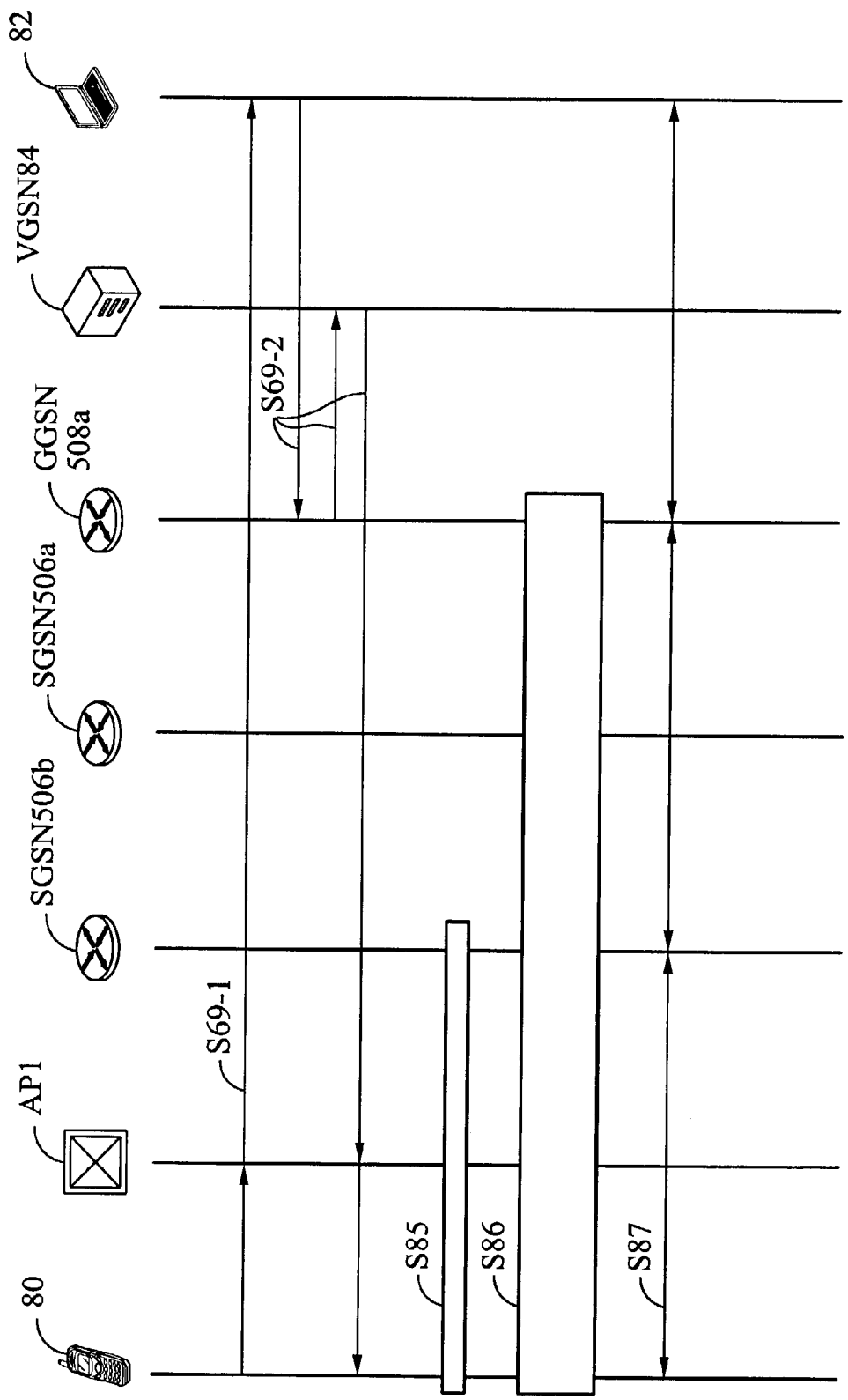
FIG. 8b shows procedures in which the mobile device moving from the WLAN to the GPRS network and returns to a new routing area after the procedures in FIG. 6.

FIG. 8b shows procedures in which the mobile device 80 moves from the WLAN network to the GPRS network and returns to a new routing area (RA). After step S69-2, the mobile device 80 moves from the cell 602a of the access point AP1 to the GPRS network 500 and returns to a new RA controlled by a new SGSN 506b. Therefore, at step 85, handover procedure for the mobile device 80 from the access point AP1 to SGSN 506b takes place. Then, the mobile device 80 starts a normal RA update procedure (S86), only updating SGSN-in-use in GGSN 508a. Then, packets are delivered between the mobile device 80 and the host 82 using the original IP address used in the GPRS network 500 (S87).

Figure 9:
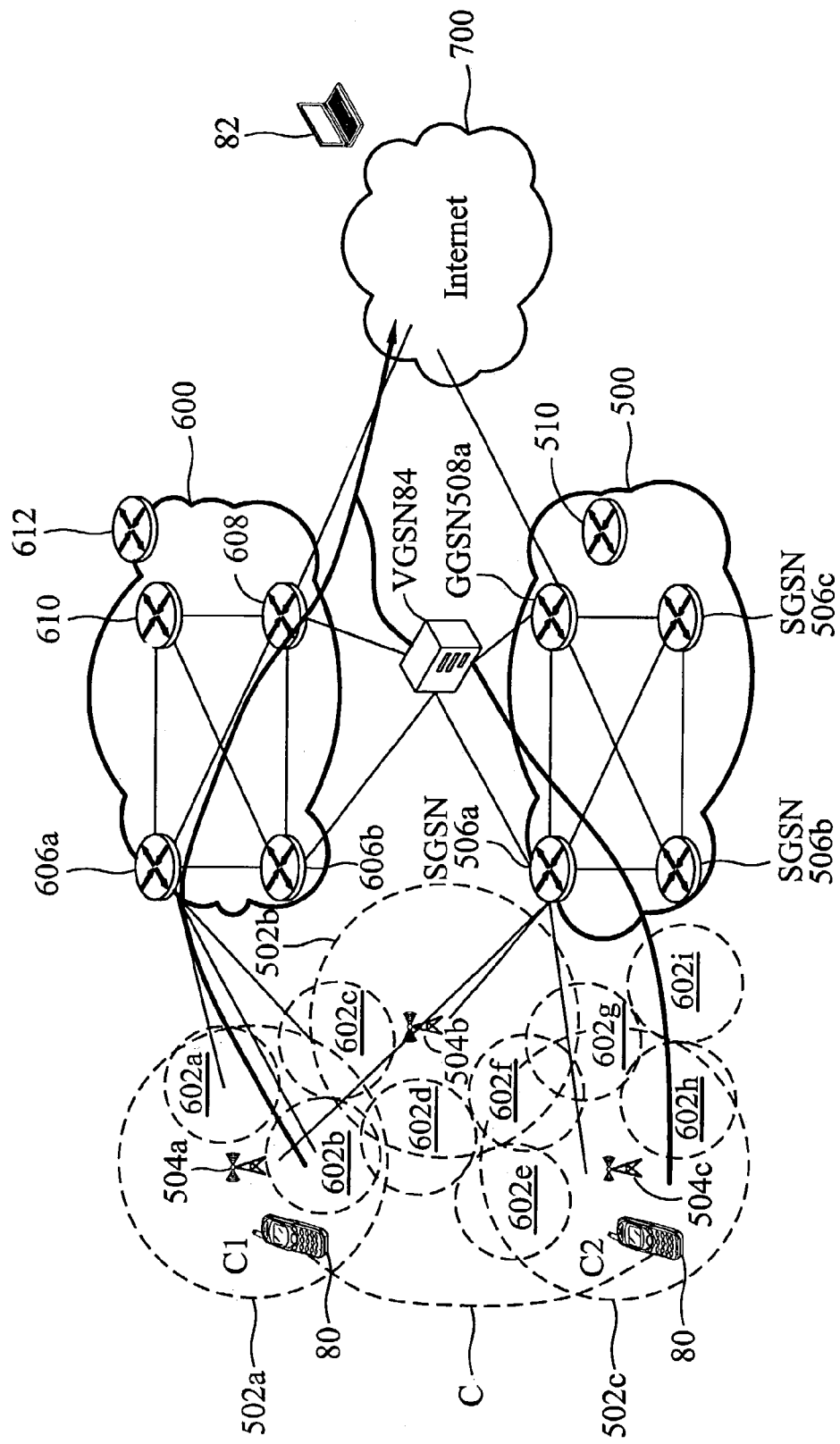
FIG. 9 shows an overall architecture in which two different wireless networks are connected to the Internet according to the second embodiment of the invention.

FIG. 9 shows an overall architecture in which two different wireless networks are connected to the Internet according to the second embodiment of the invention. The topology of the network in FIG. 9 is almost the same as in FIG. 5. The difference is that dotted line C in FIG. 9 shows the roaming route of the mobile device 80 supporting the GPRS and WLAN standards. The mobile device 80 attaches to the WLAN 600 at point C1 and starts to access a remote host 82 through the Internet 700. Then, packets can be delivered between the mobile device 80 and the remote host 82. While the mobile device 80 detects the signal from the GPRS network 500 becoming stronger than the previous one (WLAN 600) such as at point C2, it can hand over to the GPRS network 500 if the two networks 500 and 600 have a roaming agreement. We assume the IP address allocated to the mobile device 80 (or mobile station (MS)) will not change during the entire period of data service in the different networks. When the mobile device 80 moves to the GPRS network 500, the incoming packets originally from the WLAN 600 to the mobile device 80 are sent through VGSN 84 to the GPRS network 500 and ended at the mobile device 80. The outgoing packets of the mobile device 80 can follow the GPRS network 500 directly. The detailed procedures are described in conjunction with FIG. 10~FIG. 11.

Figure 10A:
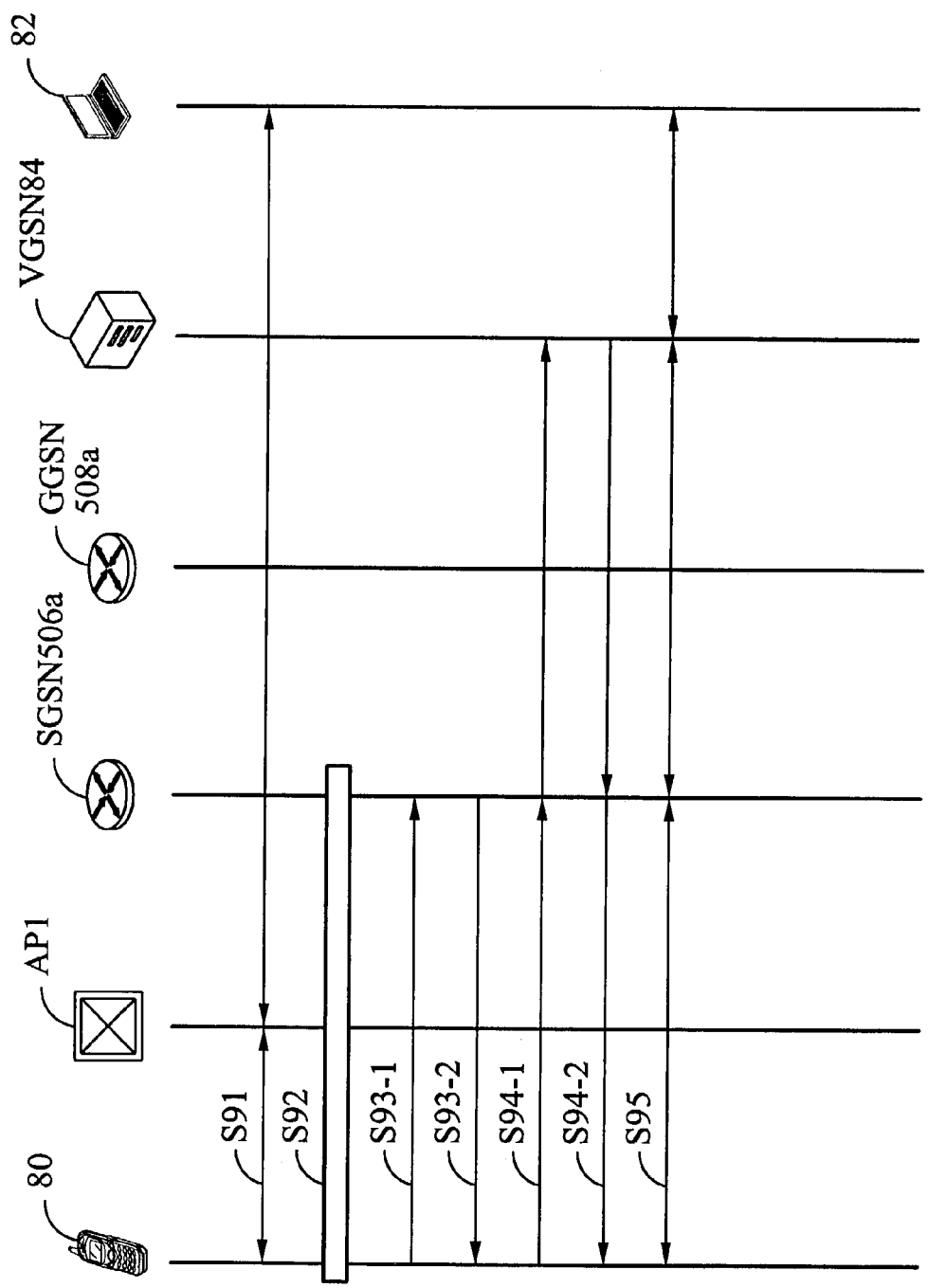
FIG. 10a shows the procedures of roaming from the WLAN to the GPRS network according to the second embodiment of the present invention.

FIG. 10a shows the procedures of roaming from the WLAN to the GPRS network according to the second embodiment of the present invention.

At step S91, the mobile device 80 attaches to the WLAN 600 and starts to access a remote host 82 through the Internet 700 and the access point AP1 of the WLAN 600.

At step S92, the mobile device 80 detects that the signal received from the GPRS network 500 is stronger than the WLAN 600, and initiates handover to the GPRS network. Step S92 performs handover procedures.

If the mobile device 80 has already attached to the GPRS network 500 and is in the same RA, it can start service and directly enter step S95. If the mobile device 80 is attached to the GPRS network 500 for the first time, it performs normal GPRS attach and packet data protocol (PDP) context activation procedures (step from S93 to S94) and can then start service.

According to GPRS specifications, the GPRS attach procedure establishes a mobility management context at the SGSN 506a to identify the location of the mobile device 80 (S93-1 and S93-2). When data packets are delivered between the mobile device 80 and the host 82, a PDP context is activated.

In the attach procedure, the mobile device 80 uses VGSN 84 as its access point network (APN) to request initialization of a WLAN IP address used in the WLAN 600 from SGSN 506a. During the PDP context activation procedure, the mobile device 80 uses the WLAN IP address to request PDP context (S94-1). Once the VGSN 84 detects the IP is a WLAN IP address and the security process is passed, it replies to the mobile device 80 with the same WLAN IP address (S94-2). The mobile device 80 can use the same IP address used in the WLAN 600.

At step 95, VGSN 84 simulates the GGSN in the GPRS network 500. The SGSN 506a sends packets to VGSN 84 and VGSN 84 sends packets to SGSN 506a. Both incoming and outgoing packets follow the same path. The packets from the host 82 of the Internet 700 to the mobile device 80 reach the WLAN 600 first. Through the gateway 608 of the WLAN 600, the packets are sent to VGSN 84. Then, the packets received by VGSN84 are sent to the mobile device 80 through SGSN 506a. As well, the packets from mobile device 80 to the host 82 of the Internet 700 reach the GPRS 500 first. Through the SGSN 506a, the packets are sent to VGSN 84. Then, the packets received by VGSN84 are sent to the host 82 of the Internet 700 through the gateway 608 of the WLAN 600.

Figure 10B:
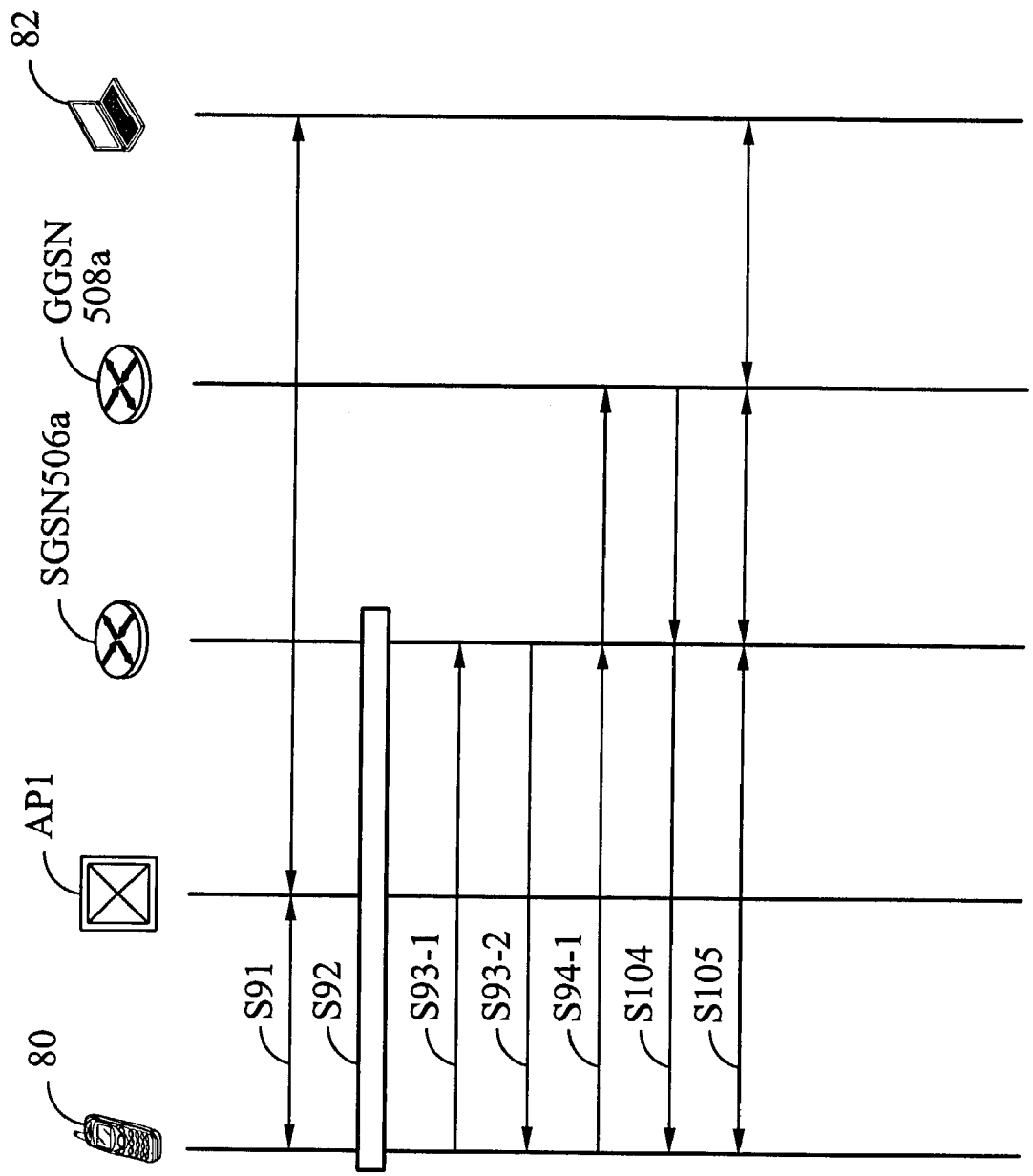
FIG. 10b shows the procedures of roaming from the WLAN to the GPRS network not supporting VGSN according to the second embodiment of the present invention.

FIG. 10b shows the procedures of roaming from the WLAN to the GPRS network not supporting VGSN according to the second embodiment of the present invention. Considering the mobile device roaming from the WLAN to the GPRS network not supporting VGSN, after the above step S94-1, GGSN 508a replies to the PDP context request of the mobile device 80 with a new GPRS IP address (S104). In this case, the mobile device 80 cannot obtain the same WLAN IP address, and must use the new GPRS IP address to access the Internet 700 and exchange packets with the host 82 thereof (S105).

Figure 11:
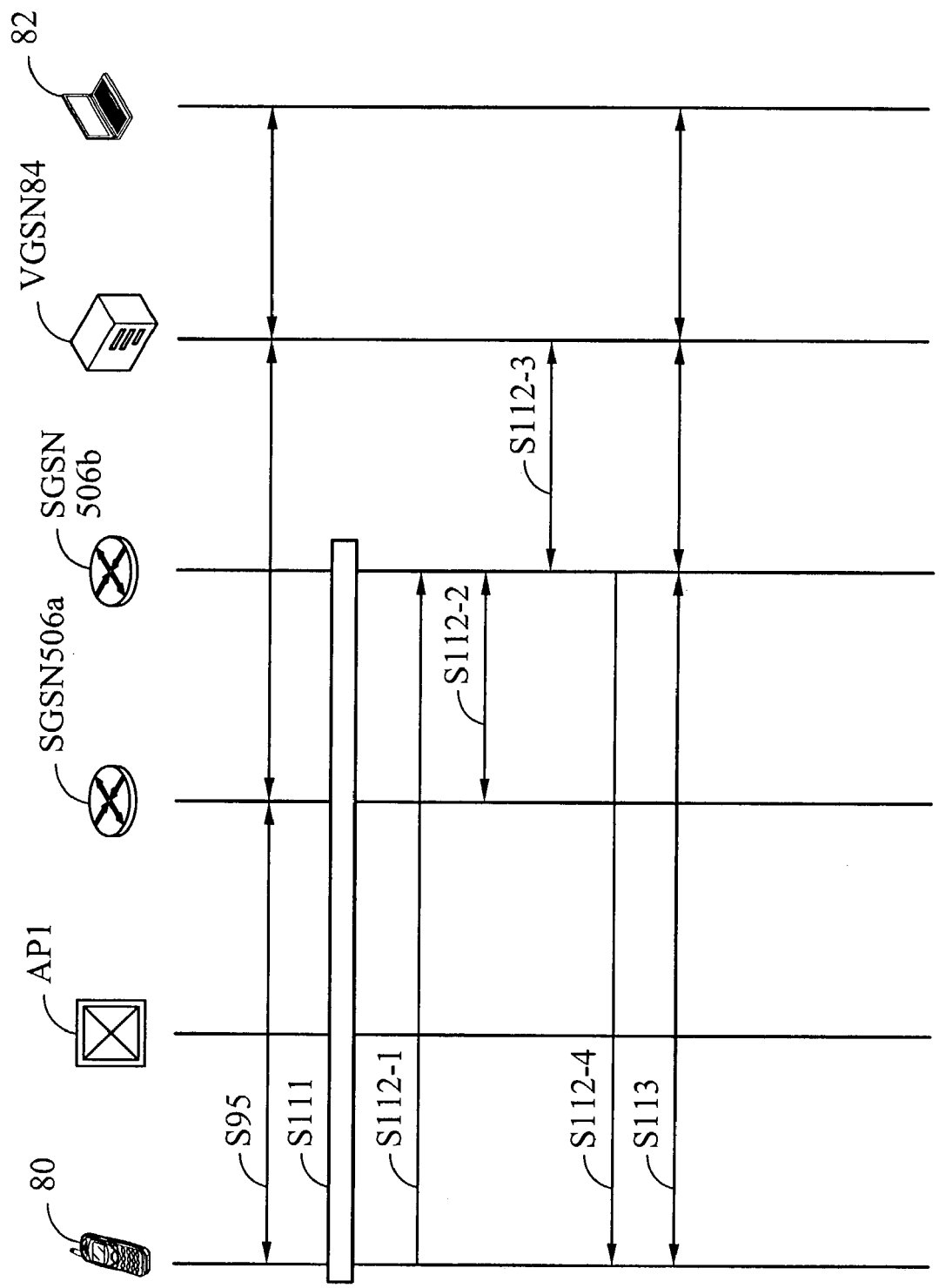

FIG. 11 shows procedures in which the mobile device moving from one RA to another RA after the procedures in FIG. 10a. After step S95, the mobile device 80 moves from the RA to a new RA. The mobile device 80 moves from the RA to the new RA in two situations. In the first situation, the new RA and the original RA are controlled by the same SGSN. In this situation, the mobile device 80 initiates a standard RA update procedure. It introduces no additional change to the routing path. Therefore, the procedure in this situation is not shown in FIG. 11.

In the second situation, the new RA and the original RA are controlled by two SGSNs, requiring update of the current SGSN 506a in use in VGSN 84. At step S111, handover between the mobile device 80 and SGSN 506b takes place. Then, the mobile device 80 sends a standard RA update message to SGSN 506a, and starts a normal inter RA update procedure (steps S112-1 to S112-4). Because VGSN 84 here simulates GGSN in the GPRS network 500, the GGSN 84 must update the new SGSN address. Then, packets are delivered between the mobile device 80 and the host 82 using the original IP address used in the GPRS network 500 (S113).

Figure 12:
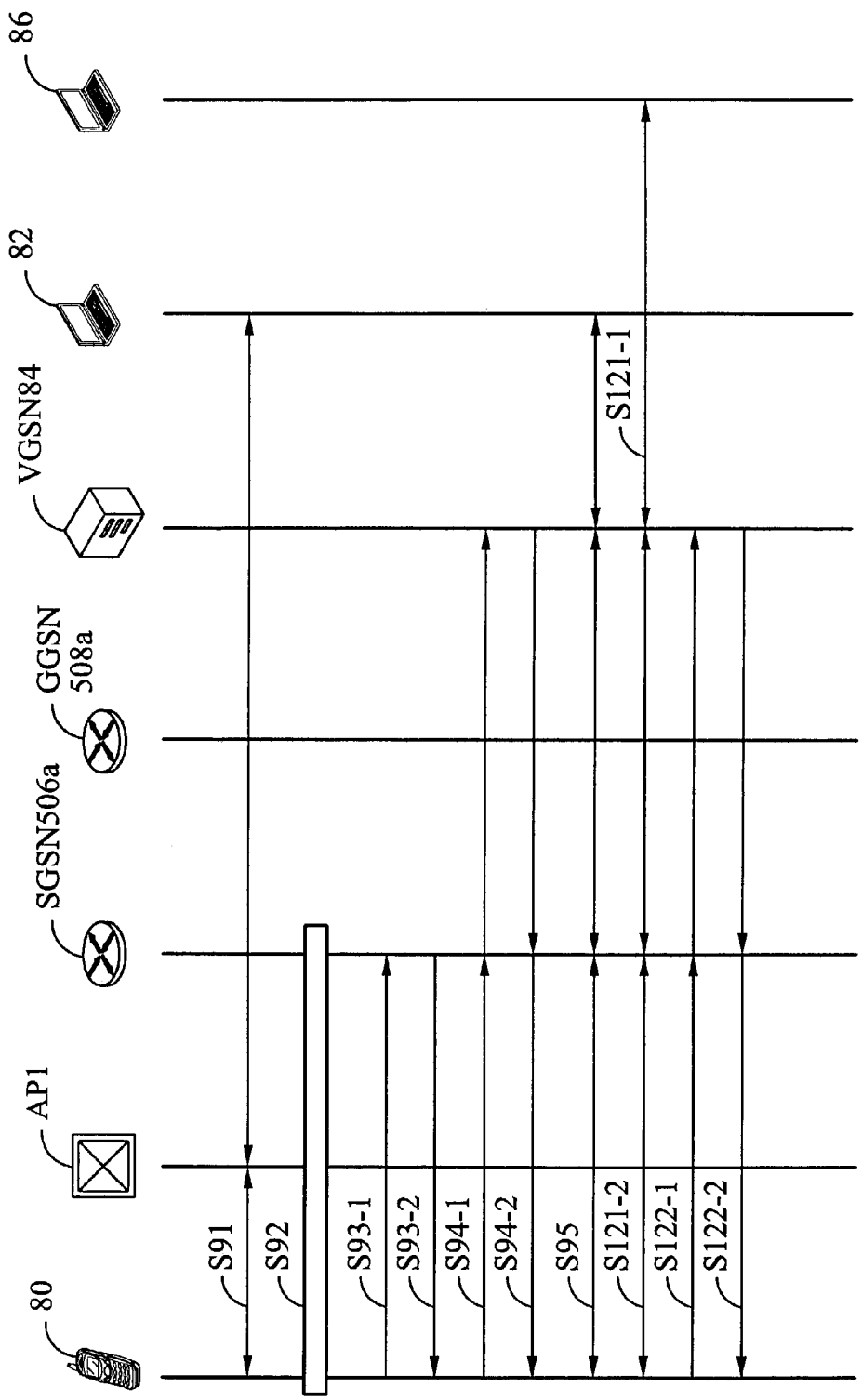

FIG. 12 shows procedures in which a new host initializes connection with the mobile device after the procedures in FIG. 10a. For a WLAN user such as the mobile device 80 located in the GPRS network 500, a new host 86 in the Internet 700 initializes access to the mobile device 80 by its GPRS address. The packets from the new host 86 to the mobile device 80 will first be handled by GGSN. Since the original PDP context maintained in SGSN 506a and VGSN 84 are for the WLAN roaming exclusive of GPRS service, a new PDP must be allocated to handle the new GPRS connection. In other words, the present invention uses separated PDP contexts to handle both WLAN address in WLAN to GPRS roaming service and GPRS address for GPRS service.

After the procedures in FIG. 12, VGSN 84 receives a request from the host 86 (S121-1). Then, VGSN 84 requests the mobile device 80 to activate a new PDP context (S121-2). During the PDP context activation procedure, the mobile device 80 uses GGSN 508a as its access point network (APN) to inform the SGSN 506a. After SGSN 506a receives the request, SGSN 506a sends it to the VGSN 84 (S122-1). After VGSN 84 receives the request, VSGN 84 sends a response comprising a new GPRS address to the mobile device 84 (S122-2).

The advantage of the present invention's method and system enabling roaming between different wireless networks via a virtual GPRS support node is that, via the virtual GPRS support node, a plurality of data packets and control signals are delivered between low and high-tier wireless networks to provide seamless roaming between two different wireless networks for a mobile device, such that the two networks can be operated independently. As well, packets for roaming users follow the node without processing by mobile IP through the Internet. The design reduces packet loss and delay.

The high tier wireless network of the present invention is not limited to the GPRS network illustrated in the embodiments. The high tier wireless network may be a Universal Mobile Telecommunication System (UMPTS) network or other 3G network with lower bandwidth but more mobility than the low-tier wireless network.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method enabling roaming between different wireless networks, for a mobile device supporting a first wireless network standard and a second wireless network standard adapted to roam between a first wireless network and a second wireless network, the method comprising the steps of:

linking to establish bidirectional communication between the mobile device and a host through the first wireless network and to deliver a plurality of data packets between the mobile device and the host through the first wireless network;

delivering a plurality of control signals to maintain a link between the mobile device and the first wireless network via a virtual GPRS support node after the mobile device roaming from the first wireless network to the second wireless network;

bidirectional communication via the virtual GPRS support node, to deliver a plurality of data packets between low and high-tier wireless networks;

returning, wherein the mobile device roams from the second wireless network to the routing area of the first wireless network;

recovering the link between the mobile device and the first wireless network using original routing information and notifying the virtual GPRS support node to stop delivery of the data packets if the routing area is the same as an original routing area hosting the mobile device before roaming; and restarting to establish a link between the mobile device and the first wireless network using original routing information obtained from a Serving GPRS support node (SGSN) of the original routing area, notifying the SGSN of the RA to handling the delivery of the data packets, and notifying the virtual GPRS support node to stop delivery of the data packets if the routing area is different from the original routing area hosting the mobile device before roaming;

wherein the first wireless network has lower bandwidth but more mobility than the second wireless network.

2. The method of claim 1, further comprising, when the mobile deice roams between different nodes of the second wireless network, delivering a plurality of control signals to maintain a link between the mobile device and the first wireless network via a virtual GPRS support node.

3. The method of claim 1, wherein the first wireless network is a General Packet Radio Service (GPRS) network.

4. The method of claim 1, wherein the first wireless network is a Universal Mobile Telecommunication System (UMTS) network.

5. The method of claim 1, wherein the second wireless network is a Wireless Local Area Network (WLAN).

6. The method of claim 1, wherein the mobile device is a mobile phone.

7. The method of claim 1, wherein the mobile device is a personal digital assistant.

8. A method enabling roaming between different wireless networks, for a mobile device supporting a first wireless network standard and a second wireless network standard adapted to roam between a first wireless network and a second wireless network, the method comprising the steps of:

linking to establish bidirectional communication between the mobile device and a host through the first wireless network and to deliver a plurality of data packets between the mobile device and the host through the first wireless network;

processing a standard register procedure of the second wireless network and delivering a control signal to an original node hosting the first wireless network in which the mobile device was situated before roaming, to notify the original node of the mobile device's exit from the first wireless network via a virtual GPRS support node after the mobile device roaming from the first wireless network to the second wireless network;

bidirectional communication via the virtual GPRS support node, to deliver a plurality of data packets between low and high-tier wireless networks;

wherein the first wireless network has higher bandwidth but less mobility than the second wireless network.

9. The method of claim 8, further comprising the steps of:

returning, wherein the mobile device roams from the second wireless network to the first wireless network registration, to process a standard register procedure of the first wireless network.

10. The method of claim 8, further comprising, when the mobile device roams between different routing areas of the second wireless network, processing a standard roaming procedure of the second wireless network.

11. The method of claim 8, wherein the second wireless network is a General Packet Radio Service (GPRS) network.

12. The method of claim 8, wherein the second wireless network is a Universal Mobile Telecommunication System (UMTS) network.

13. The method of claim 8, wherein the first wireless network is a Wireless Local Area Network (WLAN).

14. The method of claim 8, wherein the mobile device is a mobile phone.

15. The method of claim 8, wherein the mobile device is a personal digital assistant.

* * * * *